C. G. STRUBLER.
SCALE CHECK DEVICE.
APPLICATION FILED SEPT. 27, 1912.
1,213,295. Patented Jan. 23, 1917.
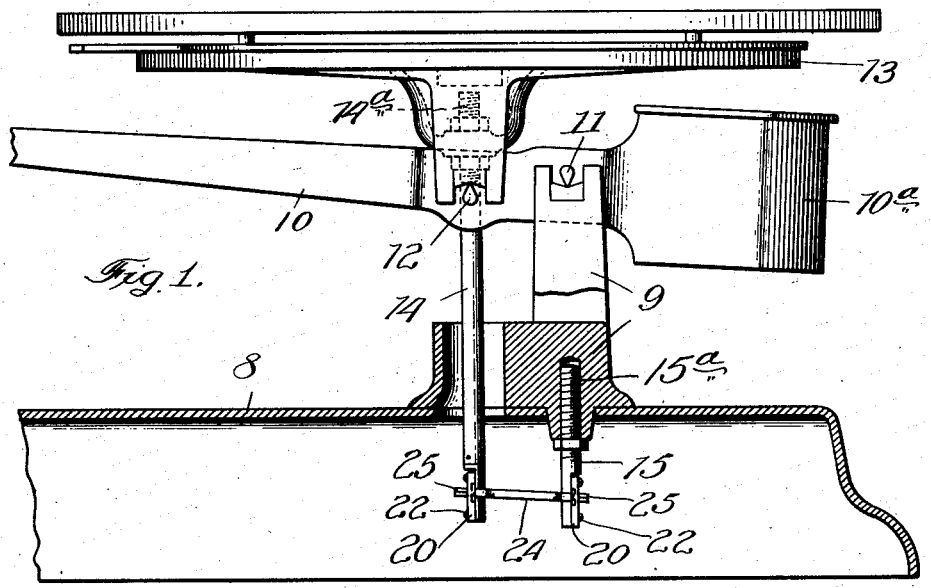
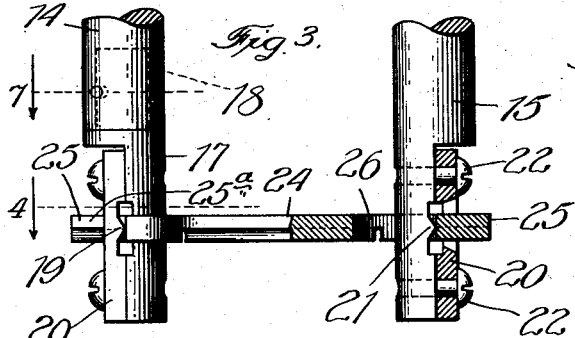
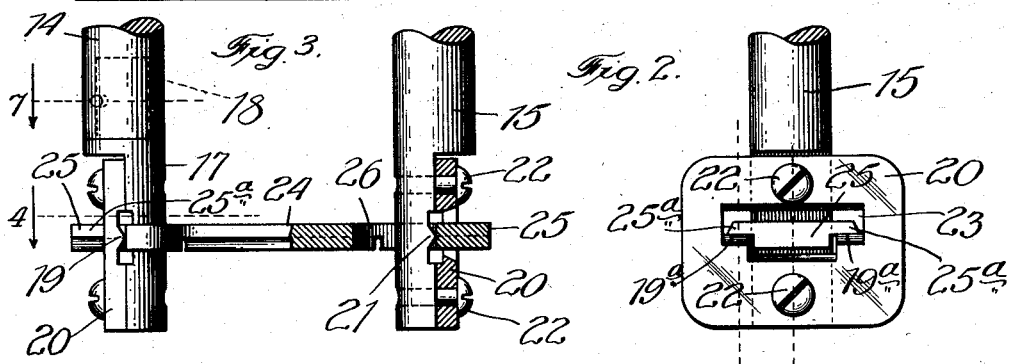
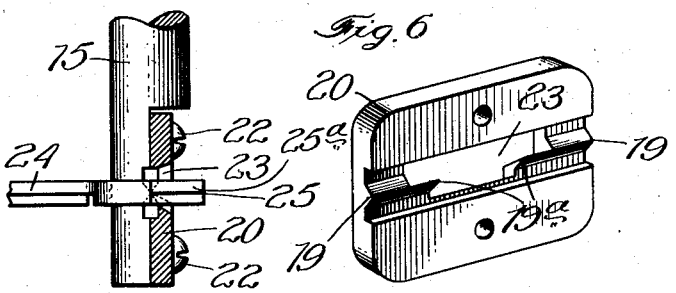
Witnesses:
Inventor:
Charles G. Strubler

UNITED STATES PATENT OFFICE.

CHARLES G. STRUBLER, OF ELKHART, INDIANA, ASSIGNOR TO STRUBLER COMPUTING SCALE COMPANY, OF ELKHART, INDIANA, A CORPORATION OF INDIANA.

SCALE-CHECK DEVICE.

1,213,295.      Specification of Letters Patent.      Patented Jan. 23, 1917.

Application filed September 27, 1912. Serial No. 722,627.

*To all whom it may concern:*

Be it known that I, CHARLES G. STRUBLER, citizen of the United States, residing at Elkhart, in the county of Elkhart and State of Indiana, have invented certain new and useful Improvements in Scale-Check Devices; and I do hereby declare the following to be a full, clear, and exact description of the invention, such as will enable others skilled in the art to which it appertains to make and use the same.

My invention relates to improvements in a platform check device adapted to scales of the counter type, which have the load-carrying platform resting on two carrying points in such a way as to require that the platform be maintained in a horizontal position during the vertical movement imparted to the platform in weighing.

The object of my invention is to provide improved means whereby the cramping and turning friction and the shifting of the bearing points on the check stems is reduced to a minimum when the weight on the platform is shifted from one side to the other.

In the drawings, Figure 1 is a view showing in elevation a section of a scale embodying my invention; Fig. 2 is an end elevation of the check and check supporting device with the upper part of the stem shown broken away; Fig. 3 is a side elevation partly in section showing the vertical check stems, the check and two supporting check plates; Fig. 4 is a plan view of showing one end of the cup away and showing a section of the check stem and check plate; Fig. 5 is an elevation in section showing the lower part of the check stem, the check and a section of the check plate; Fig. 6 is an elevation in perspective of the check plate; Fig. 7 is a cross section of the check stem on line 7—18.

As shown in the drawings (Fig. 1) 8 is a section of a scale base and 9 is a fulcrum stand; 13 a sub-platform bearing; 10 a scale lever; 14 and 15 platform supporting stems; 24 a check plate. My improved check device is shown in combination with these various parts.

The coupling plates 20 on the ends of the stems 14, 15 are seen as each having four independent pivot bearings 19 and 19ᵃ, all in the same alinement, two adapted for bearing against the flat ends of the check plate 24 and two having bearings for supporting the check plate 24 in a horizontal position. All of these bearings are of knife-edge form, and the two inner bearings 19ᵃ of each coupling plate form shelves in an opening 23 of the plate, on which the check plate 24 rests through the medium of the end extensions 25 of said plate which extend through said openings of the coupling plate. Said plates are chamfered at the sides of the said openings to reduce friction between the moving parts. These bearings 19ᵃ have their knife-edges chamfered or cut away much more than the outer ones 19, that is to a greater degree on one edge than on the other, to insure clearance for the check plate in order to keep all the bearings in perfect alinement during the arcuate movement of the check plate when in operation.

The stems 15 and 14 are shown as formed with knife edges 21 at their lower ends. On one of these stems the knife edge bearing 21 is formed on a part 18 so as to enable it to swivel part way around, as shown at 17, 18 in Figs. 3 and 7, so as to be self-alined with the bearings on the check plate 24. This swivel member 17 and the one-piece stem 15 have the coupling plates 20 fastened thereto by screws 22. As herein shown the said swivel member 17 and the lower end of the stem 15 are longitudinally cut away on their remote or outer sides, and it is on the flattened outer sides of the said parts that the knife-edge bearings 21 are formed. The cut away or reduced ends of said parts extend through openings 26 at the ends of the check plate. The coupling plates 20 are provided with the multiple knife-edge bearings 19 and 19ᵃ for the purpose of supporting the check plate 24 and to take the end thrust of the check plate. Two of these bearings 19ᵃ, 19ᵃ face upward and form shelf pivots for the check plate 24 to rest upon through the medium of its end extensions 25. The other two bearings 19, 19 face sidewise to take the end thrust of the check plate. Each of these plates 20, when fastened to the stems 14 or 15 has two inner knife-edges, one on either side of the knife-edge 21 carried by the stems or stem members, and they are arranged in the same alinement with the knife-edges 21. The knife-edges 21 bear against plain or flat surfaces of the check plate at the outer sides of the openings 26.

The check plate 24, as will be seen by referring to the drawings, Figs. 3 and 4, is made of an integral piece having at each end three alined bearings, two of which face outwardly and are at the sides of the extension 25 and one of which faces inwardly and is on the flat side of the elongated opening 26. The distance between the bearing surfaces of the check plate 24 are the same as the distances between the load and fulcrum pivots 11 and 12 on the scale lever 10.

To assemble this check plate device, the check ends 25 are first passed through the openings 23 in the coupling plates 20, then the ends of the stems 14, 15, which carry the knife-edges 21, are passed through the openings 26 in the check plate. The connecting plates are now screwed onto the stems 14, 15. When assembled each coupling consists as a whole of five knife-edge working points, and in addition four chamfered friction points, two on the check plate and two on the check plate extension. The two stems 15 are connected at their upper ends in the manner shown in Fig. 1, one to the fulcrum 9 of the scale, and the other to the platform 13. They are locked in position with the lock nuts as shown or in any other suitable manner.

To adjust the weighing points on the platform of the scale of this type when the weight is moved from the center of the platform to a point either forward or back from the center, it is necessary to either lengthen or shorten the distance between the bearing points on one or the other of the stems until both stems have their bearing points equal distances apart. That is, the distance from the knife edge of the fulcrum to the knife edge on the bottom of the base stem must be substantially the same as the distance from the knife edge of the load pivots to the bottom pivots of the platform stem. For convenience of adjustment, these stems are made screw-threaded and locked with lock nuts when in the proper positions. In order that these distances may be non-changeable and frictionless, I use a fixed knife-edge bearing, as shown at the lower end of the stem.

While I have shown and described in the foregoing drawings and specifications but one application of my device to a counter scale, I desire it to be understood that such drawings and description is not intended to limit my said invention to its employment in such type of scale, and I wish also to state that many of the combinations and details above described could be used on other scales without departing from the spirit of my invention.

What I claim is,—

1. In a scale check device, a stem, a transverse knife-edged pivot integrally formed on said stem, an apertured plate with alined integral knife-edge pivots fastened to said stem, and a check plate having multiple alined bearings operatively connected with said stem and plate.

2. In combination, a scale check device consisting of a plurality of stems, each having an integral, laterally-directed, knife-edge pivot bearing near the end, plates fastened to said stems and having multiple alined knife-edge shelf and laterally directed pivot bearings, and a double ended check plate having internal and external flat alined bearings at each end to engage with said pivot bearings of the stems respectively.

3. In a scale check device, a threaded stem having an integral side disposed knife-edge in alinement with the center of the stem, a removable plate fastened to said stem, said plate having multiple alined knife-edges, two of which aline with and face the knife-edge on said stem and point inward, the other two being shelf pivots and pointing upward, and a check plate having flat internal and external alined bearings adapted to work against the knife-edges of said removable plate and of said stem, with means to hold the check plate centrally of the shelf pivots.

4. In a scale check device, a stem provided with a knife-edge near one of its ends, a plate having an opening and vertically disposed supporting knife-edges in said opening, said plate also provided with longitudinally projecting knife-edges, a check plate having an extension on its end, a portion of which is recessed and adapted to pass through the opening in said plate, and resting on the supporting knife-edges of said plate, said check plate having flat contacting surfaces adapted to work against the knife-edges on said plate and stem, all substantially as shown and described.

5. In a scale check device, a stem having a knife-edge pivot swivelly mounted thereon, and a multiple knife-edge plate removably fastened to the swivel end of said stem, all substantially as shown and described.

6. In a scale check device, a plate having an open center and provided with multiple alined knife-edge bearings, two of which are longitudinally disposed and face sidewise and two of which face upward, the side of said plate being in the same plane with the knife-edges, all substantially as shown and described.

7. In a scale check device, a rectangular plate having an open center and provided with multiple alined shelf and knife edge pivots longitudinally disposed.

8. In a scale check device, a stem having a laterally facing transverse, fixed knife-edge pivot, a check plate having an opening through which the stem extends and having an internal bearing for engagement with the knife-edge pivot of the stem and at the sides thereof with external bearings alined with the internal bearing, and a coupling plate removably attached to the stem and having alined knife-edge pivots for engagement with the external bearings of said check plate, said coupling plate having an opening through which the check plate extends and provided with shelf pivots to support the check plate.

In testimony whereof I affix my signature in presence of two witnesses.

CHARLES G. STRUBLER.

Witnesses:
DION GERALDINE,
R. T. GRAVES.